3,826,636
CHANNEL FOR THE CONVEYANCE OF
LIQUID GLASS
Franz Classen, Porz-Grengel, Germany, assignor to Erste Deutsche Floatglas GmbH & Co. OHG, Porz-Cologne, Germany
Continuation of abandoned application Ser. No. 885,499, Dec. 16, 1969. This application Dec. 20, 1971, Ser. No. 209,892
Claims priority, application Germany, Jan. 4, 1969, P 19 00 388.4
Int. Cl. C03b 18/00
U.S. Cl. 65—182 R  6 Claims

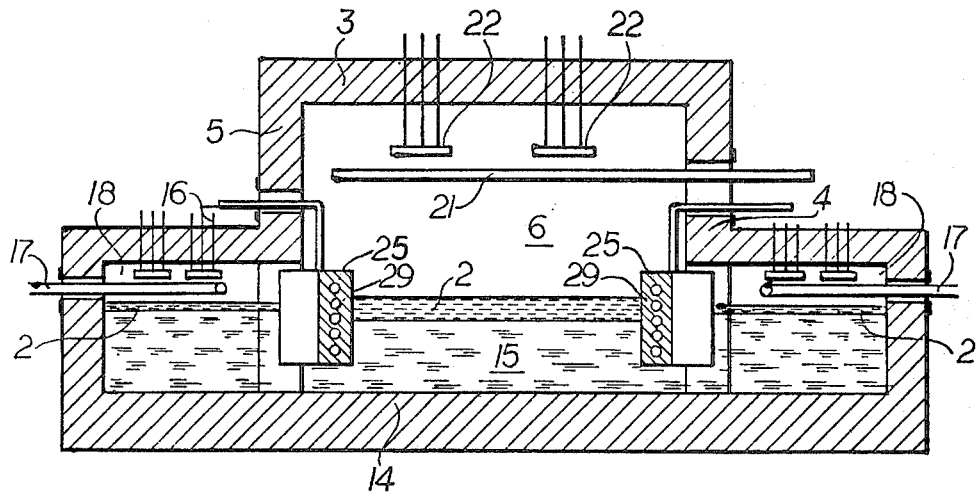
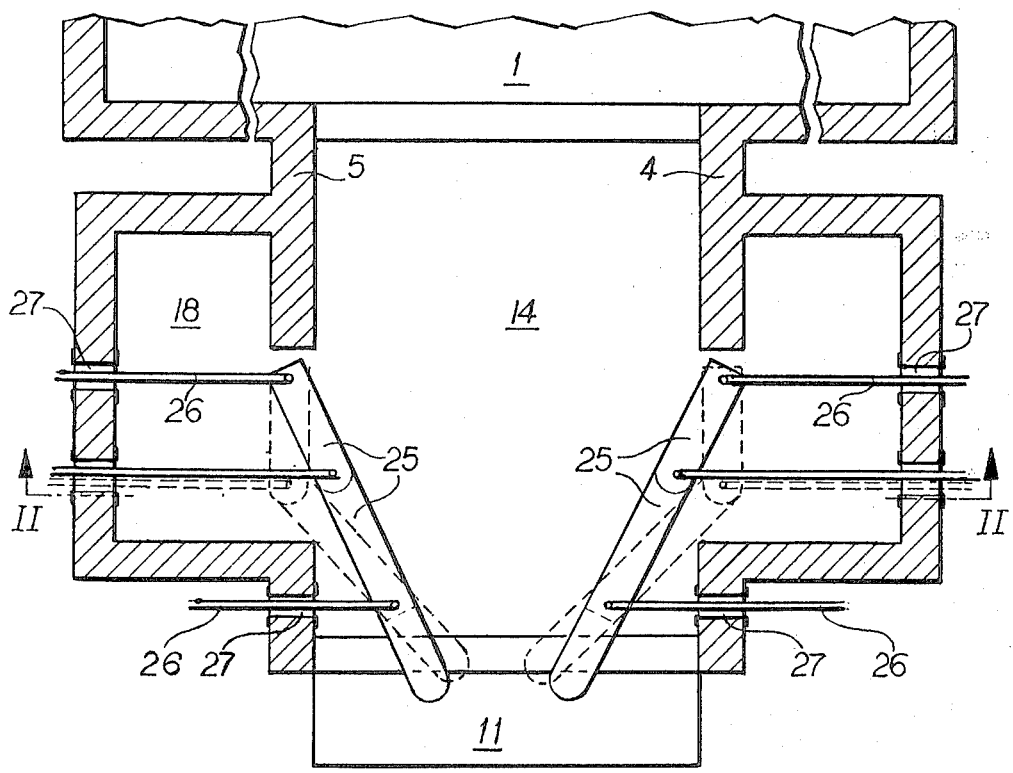

ABSTRACT OF THE DISCLOSURE

A channel for the conveyance of molten glass comprises a body of molten metal such as tin whose temperature can be regulated, and on which the glass floats. There are chambers located on opposite sides of the channel which communicate with the channel to supply molten tin to the channel. Both the chambers and the channel are equipped with heating and cooling elements. There are adjustably mounted lateral blocks having heating means within the blocks located toward the outlet end of the channel to limit the width of the molten glass stream therein.

This is a continuation of application Ser. No. 885,499, filed Dec. 16, 1969, now abandoned.

In the case of most methods for processing molten glass the glass which has been produced in a glass melting furnace is supplied to the further processing apparatus or station via a so-called channel or feeder. This is the case both in classical and in more modern methods for the production of an endless glass strip, such as in casting glass processes, plate glass making processes and, more particularly, in the float glass process.

Generally, the channel has to fulfill various requirements. On the one hand within the channel or feeder the rate of flow must be controlled so that a constant quantity of glass per unit time is supplied to the working station. On the other hand, the glass stream in the channel or feeder must be reduced to a certain predetermined optimum width. It has thus been found, in the case of the production of float glass, that for the homogeneity of the eventual glass strip the flow characteristics in the channel or feeder play a predominant role, and that for each particular plant and each particular rate of melting specific flow conditions are necessary in order to achieve optimum results. The flow characteristics in the channel are furthermore influenced substantially by the temperature obtained in the channel and by the shape of the channel. The optimum shape can only be computed with difficulty and instead must be determined on the basis of practical experience. Furthermore, the channel has to fulfill the requirement of providing a regulating effect on the temperature of the glass flow which must have its temperature kept within comparatively close tolerances.

Known channel constructions are generally rigid, i.e., they cannot readily be adapted to suit optimum conditions. As regards temperature regulation in the glass flow there is a certain disadvantage in that time elapses before the temperature of the glass is changed because the supply or removal of heat is substantially only through the upper face of the glass. This is because abrupt local cooling has a disadvantageous effect on the quality of the glass. In the case of known arrangements, therefore, the transfer of heat is carried out by means of radiation. As regards the narrowing or pinching out of the glass flow, the known constructions cannot readily provide for changes.

One object of the invention is to overcome these disadvantages in known channel or feeder constructions.

A further object of the invention is to provide a feeder or channel which has a wide range of application and provides for an enhanced conditioning of the glass stream in it. Furthermore, the invention is intended to provide for an improved apparatus for varying the lateral flow delimiting means and thus for adjusting the effective cross section of the channel.

Accordingly the present invention consists in a glass channel for conveying molten glass, the channel comprising a bottom whose surface is at least partially constituted by the surface of a bath of molten metal, such as tin, whose temperature can be regulated.

In accordance with a first embodiment of a channel or feeder in accordance with the invention it is not only possible to achieve an excellent conditioning of the glass stream, but it is also possible even to regulate the speed of flow of the quantity of glass passing along the feeder exclusively by varying the viscosity of the glass melt by changing the temperature of the metal bath. For this purpose use can be made of known arrangements so as to influence the temperature of the glass flow and thus vary the speed of movement. However, the device or apparatus in accordance with the invention constitutes additionally a particularly effective and simple construction. Its particular advantages lie in that the liquid metal path, owing to its large surface area, its high thermal conductivity, and its intimate contact with the glass melt, provides for an effective and even removal of heat, without an abrupt and local cooling effect being exerted on the glass, which, as has already been mentioned, leads to flaws in the glass. In order to regulate the temperature of the tin bath heating and/or cooling devices can be provided which act on the tin bath.

In accordance with a particularly convenient embodiment of the invention chambers are provided to the sides of the channel which are hydraulically connected with the tin bath inside the channel, and the cooling and/or heating devices are provided in the chambers. In this arrangement it is possible in principle to ensure that a glass layer is arranged on the tin bath inside these chambers so that additional means for protecting the tin bath against oxidation is not necessary.

If required the effect of the metal bath on the glass can be amplified by heating and/or cooling elements arranged above the glass stream.

In accordance with a particularly convenient embodiment of the invention lateral limiting blocks for the glass stream or flow are provided within the channel and are immersed in the tin bath. Owing to the fact that these limiting blocks float in the tin bath their position can be readily changed and the pinching out of the glass flow or stream in order to make it narrower can be varied as desired to achieve optimum results.

In accordance with a further feature of the invention the limiting blocks can be provided with setting means extending to outside the channel so that the desired change in the position of the limiting blocks during operation is further simplified. The height of the glass flow above the tin bath can in turn be changed by varying the level of the tin bath. In this manner the flow pattern within the channel can be furthermore influenced and it is possible to convey particular layers of the glass faster than other layers.

The invention is now described in more detail with reference to the accompanying drawings.

FIG. 2 is a horizontal section through a second embodiment of a channel in accordance with the invention.

FIG. 3 is a vertical section on the line II—II through the channel or feeder shown in FIG. 2.

Figure 1:
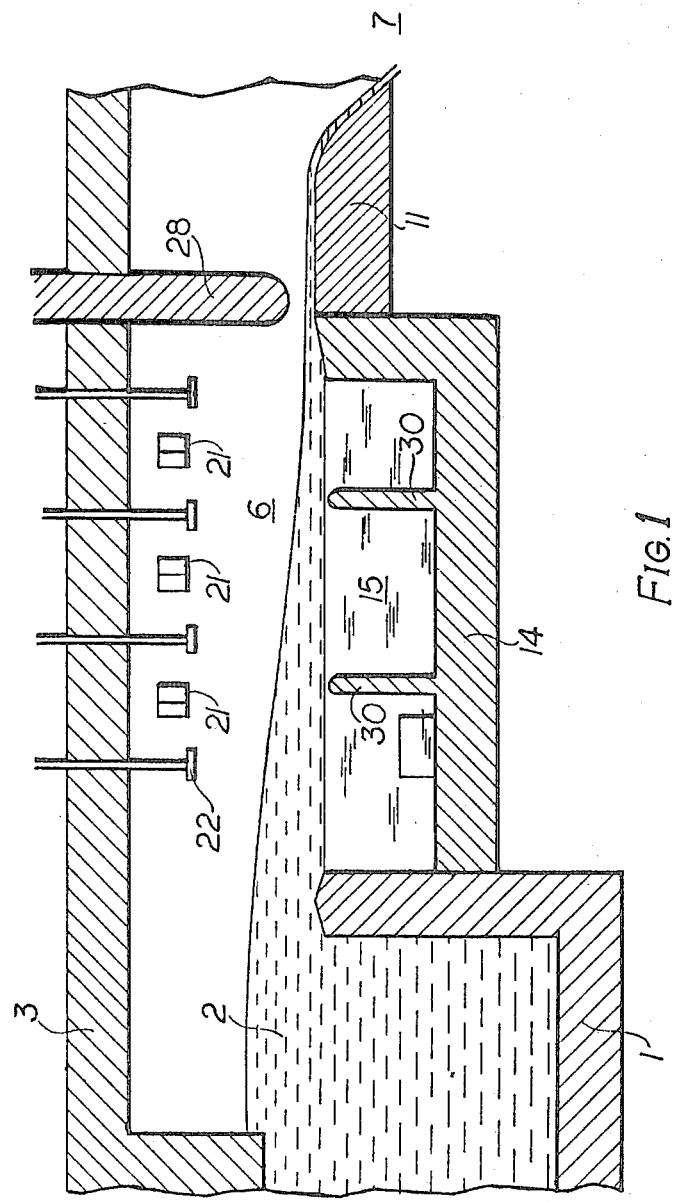
FIG. 1 shows a first embodiment of the invention in its simplest form, in vertical longitudinal section.

In the glass melting tank 1 melting of the glass takes place. The glass melt 2 is supplied to a roll stand or a float glass installation denoted by reference numeral 7 through a channel 6 delimited by the roof 3 and the side walls 4 and 5.

The bottom of the channel 6 is formed by a container 14, of refractory material, ending with the level of the outlet end 11. A tin bath 15 is in the container 14 and its temperature is regulated by the heating and cooling elements 16 and 17. The heating and cooling elements 16 and 17 can be conventional electrical heating arrangements, induction heating arrangements, or coolant carrying tubes or the like as will be familiar to those in the art. In the case of the embodiment of the invention shown in FIGS. 2 and 3 the heating and cooling elements 16 and 17 are not arranged in the actual space within the channel itself, that is to say below the glass melt 2, but within the chambers 18 arranged to the side of the channel. These chambers are connected with the actual tin bath container 14 and to a certain extent fulfill the function of a heat exchanger. The arrangement of the cooling arrangement outside the actual channel has the advantage among others that the removal of gas occurring with a cooling of the liquid tin does not lead to flaws in the glass stream due to bubble formation.

Following the channel a conventional vertically moving regulating slide can be provided in order to regulate the rate of flow through the channel. It is also possible, as is shown in the figures, to dispense completely with a regulating slide and, owing to the excellent thermal conductivity properties of the liquid metal bath within the channel, to control the rate of flow exclusively by regulation of the temperature of the tin bath 15, providing there is a sufficient cooling of the tin bath 15 the viscosity of the glass melt in the direction of flow of the glass melt increases in accordance with the degree of removal of heat through the tin bath 15 and the rate of flow is decreased in accordance with the increase in the viscosity. A rate of flow is reached which bears a definite relationship to the degree of heat removal by the tin bath 15. Since in the temperature range in question the viscosity of the glass varies considerably, comparatively small alterations in temperature of the tin bath 15 are sufficient to achieve a good regulation of the rate of flow of the glass flowing through the channel or feeder.

Above the tin bath 15 it is also possible to provide coolers 21 extending over the glass stream. The coolers 21 are put into operation when it is required to provide an increased cooling of the tin bath 15. Furthermore, for controlling the temperature in the channel or feeder it is also possible to provide additional electrical heating elements 22 above the glass stream or flow.

As can be seen from FIGS. 2 and 3, lateral limiting blocks 25, including first and second pivotally attached sections, are provided with container 14 in the case of this embodiment of the invention. The limiting blocks 25 float in the tin bath 15. They are held in the position required by linkages 26, which pass through suitably sealed off openings 27 to the outside, and since the linkages 26 are operated from outside the channel, adjustment of the position of the limiting blocks can readily be carried out at any time. Owing to the arrangement of these floating limiting blocks 25 and to the subdivision which may be carried out if necessary, both the final breadth of the pinched glass stream and also the extent along which the glass stream is narrowed, can be changed within wide limits. The limiting blocks 25 can be provided with heating means for heating at least those surfaces of these limiting blocks which come in contact with the glass stream in order to reduce friction between the glass stream and the block faces which it contacts. The glass melt 2 flows into the chambers 18 where it spreads out on the tin bath and protects the tin against oxidation.

If desired it is also possible to provide partition walls (not shown) within the tin bath 15 extending perpendicular to the drection of flow of the glass melt 2. These walls divide up the tin bath into several sequential more or less separated sections. Such a subdivision has the advantage of making it possible to regulate the temperature of the tin bath within the individual sections so that a controlled removal of heat from the underside of the glass layer can be achieved.

I claim:

1. An apparatus for the conveyance of molten glass comprising:
   means defining a channel;
   a bath of molten metal disposed, at least partially in said channel;
   means for regulating the temperature of said bath;
   a molten glass stream supported on said molten metal bath;
   means defining at least two chambers arranged on opposite longitudinal sides of said channel, and hydraulically communicating with said channel to allow the flow of a portion of said molten metal bath and said molten glass supported thereon to pass therethrough;
   heating elements disposed above said molten glass stream in said channel;
   coolers disposed above said molten glass stream in said channel;
   heating elements disposed above said molten glass in said chambers;
   cooling elements disposed above said molten glass in said chambers;
   adjustably mounted lateral limiting blocks positioned to float partially emerged in said molten metal bath disposed toward an outlet end of said channel on each longitudinal edge of said molten glass stream in said channel to limit the width of said molten glass streams;
   heating means disposed in said lateral limiting blocks to heat the lateral edges of said molten glass stream in contact with said lateral limiting blocks; and
   adjusting means operatively associated with said lateral limiting blocks extending to outside said channel to enable an adjustment of the position of said blocks while said molten glass is flowing in said channel.

2. An apparatus substantially as set forth in claim 1, further characterized in that:
   partition walls positioned transversely to said channel are disposed in said channel to divide said channel into a plurality of sections; and
   temperature regulating means are disposed in each of said sections to regulate the temperature of said molten metal in said sections.

3. An apparatus substantially as set forth in claim 1, further characterized in that:
   means for regulating the level of said molten metal bath are provided to regulate the vertical position of said molten glass stream in said channel.

4. The apparatus of claim 1, wherein each adjustable lateral limiting block comprises:
   a first section pivotally attached at one end to an end of said first section opposite said end thereof which is pivotally attached to said means defining said channel; and
   said second section being adapted to pivot about its point of pivotal attachment to said first section independently of any pivotal movement of said first section about its point of pivotal attachment to said means defining said channel.

5. The apparatus of claim 4, wherein said adjusting means operatively associated with each of said lateral limiting blocks comprises:
   at least three linkages, one linkage affixed at one of its ends to said first section of said limiting block adjacent said pivotal attachment point of said first section to said means defining said channel, a second one of said three linkages affixed at one of its ends to said second section of said limiting block adjacent said pivotal attachment point of said second section to said first section, and a third one of said three linkages affixed at one of its ends to said second section of said limiting block between said pivotal attachment point and an end opposite said pivotal attachment point;

means defining at least three sealable openings in a wall of said apparatus adjacent each of said lateral limiting blocks; and said linkages extending through said sealable openings in said wall to the outside of said apparatus to allow the location of said limiting blocks to be adjusted from outside the apparatus.

6. The apparatus of claim 5, wherein:

said heating elements disposed above said molten glass in said chambers and said channel are induction heaters; and said cooling elements disposed above said molten glass in said chambers and said channel are coolant carrying tubes.

References Cited

UNITED STATES PATENTS

| 3,525,601 | 8/1970 | Ohsato | 65—182 R X |
| 3,231,351 | 1/1966 | Birchard | 65—182 R X |
| 3,433,612 | 3/1969 | Dickinson et al. | 65—99 A |
| 3,533,773 | 10/1970 | Fujimoto et al. | 65—99 A |

ROBERT L. LINDSAY, JR., Primary Examiner.

U.S. Cl. X.R.

65—186, 324, 346